United States Patent [19]
Isayama et al.

[11] Patent Number: 5,311,899
[45] Date of Patent: May 17, 1994

[54] COUPLING DEVICE

[75] Inventors: Kazuhisa Isayama, Mizumakimachi; Norihiro Takasaki; Eiji Kariya, both of Kitakyushu; Toshiyuki Fukumoto, Toyonaka, all of Japan

[73] Assignees: Mitsubishi Kasei Corporation; Mitsubishi Kasei Engineering Company; Nippon Pillar Packing Co., Ltd., all of Japan

[21] Appl. No.: 21,550

[22] Filed: Feb. 24, 1993

[51] Int. Cl.⁵ ............................................. F16K 11/20
[52] U.S. Cl. ..................................... 137/240; 137/606; 137/614.05; 251/149.6
[58] Field of Search ............. 137/240, 614.05, 614.06, 137/606; 251/149.6

[56] References Cited

U.S. PATENT DOCUMENTS

| 3,550,624 | 12/1970 | Johnson | 137/614.05 X |
| 3,680,591 | 8/1972 | Vik | 137/614.05 |
| 4,541,457 | 9/1985 | Blenkush | 137/614.05 X |
| 5,058,619 | 10/1991 | Zheng | 137/240 |
| 5,129,423 | 7/1992 | Fournier et al. | 137/614.05 |
| 5,150,880 | 9/1992 | Austin et al. | 137/614.05 X |

FOREIGN PATENT DOCUMENTS 63-107790 5/1988 Japan .

Primary Examiner—Stephen M. Hepperle
Attorney, Agent, or Firm—Jones, Tullar & Cooper

[57] ABSTRACT

A coupling device intended to prevent impurities such as dust and particles adhering to the end face of a solution supplying male pipe 2 from being mixed with a high purity chemical solution N, which will be supplied through the device, not to degrade the purity of the solution. It includes a check valve 7 arranged in that end portion of a solution passage 5 in the male pipe 2 which is inserted into a cleaning chamber 15, a valve pusher 44a arranged in that end portion of a solution passage 43 in a solution supplied female pipe 3 which is connected to the passage 5 in the male pipe 2 to push the check valve 7 to open the passage 5, a valve system for opening and closing the passage 43 when the female pipe 3 is reciprocated in the axial direction, and a check valve 51 located on the outlet side of a cleaning liquid passage 48.

9 Claims, 3 Drawing Sheets

COUPLING DEVICE

BACKGROUND OF THE INVENTION

1. Field of the Invention

The present invention relates to a coupling device suitable for transferring various kinds of solution such as corrosive and high purity chemical ones and ultra-pure water from the transportation tank to the storage tank and vice versa.

2. Description of the Prior Art

Japanese Patent Disclosure Sho 63-91188, for example, discloses a coupling device of this type wherein those portions of male and female pipes which are to be connected together are washed and cleaned and then connected to each other.

According to this coupling device, the front end of the male pipe is inserted into a cleaning chamber and then into a spray ring hung in the cleaning chamber and it is fixed adjacent to the front end of the female pipe fixed in the cleaning chamber and held in the spray ring. While keeping these front ends of the male and female pipes under this state, cleaning liquid is jetted against them through apertures in the inner circumference of the spray ring to wash off impurities such as dust and particles from them. An air cylinder is then driven to connect the male and female pipes together.

In the case of this coupling device, however, cleaning liquid is jetted only to outer circumferences of those front ends of the male and female pipes which are connected to each other. This makes it difficult to remove impurities from that front end face of the male pipe which is to be contacted with the front end face of the female pipe. When the male and female pipes are connected together while leaving the front end face of the male pipe under this state, therefore, impurities such as dust and particles left are mixed with a solution supplied through the pipes to thereby degrade the purity of the solution. Particularly in the case of chemical solutions whose purity must be kept high, their qualities are remarkably degraded while being supplied through the pipes. The coupling device is not suitable for high purity chemical solutions, accordingly. It is therefore used only in a limited field.

SUMMARY OF THE INVENTION

The present invention is therefore intended to eliminate the above-mentioned drawbacks.

Accordingly, an object of the present invention is to provide a coupling device capable of more reliably cleaning and removing impurities such as dust and particles from the connecting front end face of the male pipe to keep higher the purity of a solution supplied through the device.

Another object of the present invention is to instantly drain the removed impurities outside the device to keep the purity of the solution higher.

A further object of the present invention is to more reliably prevent the male pipe from being mistakenly disconnected from the female one or connected to it to keep the sealing of the device unchanged.

A still further object of the present invention is to prevent the male pipe from being connected to a female one which does not correspond to it.

According to an aspect of the present invention, there can be provided a coupling device wherein the male pipe inserted into a cleaning chamber is fixed adjacent to its corresponding female pipe, which has been arranged in the cleaning chamber, by a pipe fixing means, and the female pipe is moved by a pipe moving means in such a direction that it can be connected to the male pipe, said coupling device comprising a check valve arranged in that end portion of a solution passage in the male pipe which is located on the side of the female pipe; a valve pusher formed in that end portion of a solution passage in the female pipe which is located on the side of the male pipe to push the female pipe against the male one so as to cause the check valve to open the solution passage in the male pipe; a valve system arranged in the rear end portion of the solution passage in the female pipe to move the female pipe in the axial direction so as to open and close the solution passage in the female pipe; a cleaning liquid passage communicated with the solution passage in the female pipe to supply cleaning liquid through it; and a check valve arranged in the outlet of the cleaning liquid passage.

In the case of this coupling device, the male pipe inserted into the cleaning chamber is fixed adjacent to the female pipe which has been arranged in the cleaning chamber while driving the pipe fixing means. The cleaning liquid passage communicated with the solution passage in the female pipe is then opened by the check valve and a cleaning liquid is supplied into the cleaning liquid passage to jet the liquid against the connecting front end portion of the male pipe. Impurities such as dust and particles adhering to the connecting front end portion, particularly front end face of the male pipe can be thus cleaned and removed from them. After this cleaning process, the pipe moving means is driven to move the female pipe in the axial direction. The check valve in the connecting front end portion of the solution passage in the male pipe is thus pushed by the valve pusher of the female pipe to open the solution passage in the male pipe and air-tightly communicate it with the solution passage in the female pipe. This can more reliably prevent the impurities from being mixed with the solution supplied through these passages. When various solutions are to be transferred between the transportation tank and the storage tank, therefore, their purities cannot be degraded by impurities mixed. This makes the coupling device more reliable and suitable for more solutions including chemical ones whose purities must be kept high.

According another aspect of the present invention, the cleaning chamber is a space defined by a flange fitted into the connected end portion of the female pipe and by a case cover fixedly screwed to the flange and the case cover has in its bottom side a drain hole through which the cleaning liquid is drained.

In the case of the coupling device, therefore, the cleaning chamber is formed integral to the female pipe. A series of the processes of cleaning and removing impurities and connecting the male and female pipes together can be thus continuously and more efficiently carried out. In addition, impurities cleaned and removed can be instantly drained together with the cleaning solution used through the drain hole of the case cover. This prevents impurities removed from being mixed with the solution supplied to thereby keep the purity of the solution unchanged.

According to a further aspect of the present invention, a sensor is attached to that face of the flange, which is contacted with the solution supplied, to detect whether the male and female pipes have been connected together or detached from each other, and an automatic control unit starts and stops the supply of solution responsive to signals applied from the sensor.

In the case of the coupling device, therefore, the supply of solution cannot be started unless both of the male and female pipes have been reliably connected to each other. In addition, the supply of solution can be automatically stopped when the male pipe is mistakenly disconnected from the female one. The leakage of solution which is caused when both of the male and female pipes are faultily connected to each other can be thus more reliably prevented.

According to a still further aspect of the present invention, a key system is arranged between the male pipe and the case cover of the female pipe to allow both of the pipes to be connected together only when the keying pattern of the key system coincides with a solution to be supplied through the pipes.

In the case of the coupling device, therefore, both of the male and female pipes cannot be connected together unless the keying pattern coincides with a solution intended. The primary error of connecting the male pipe to a female one which is different in kind from that of the male pipe can be prevented.

To add more, it is preferable that pure water is used as the cleaning liquid. More preferably, pure water and dry gas are alternately used. Further, the device is more suitable for chemical solutions whose purities must be kept high.

These and other features as well as merits of the present invention will become more apparent from the following detailed description.

DETAILED DESCRIPTION OF THE PREFERRED EMBODIMENT

Figure 1:
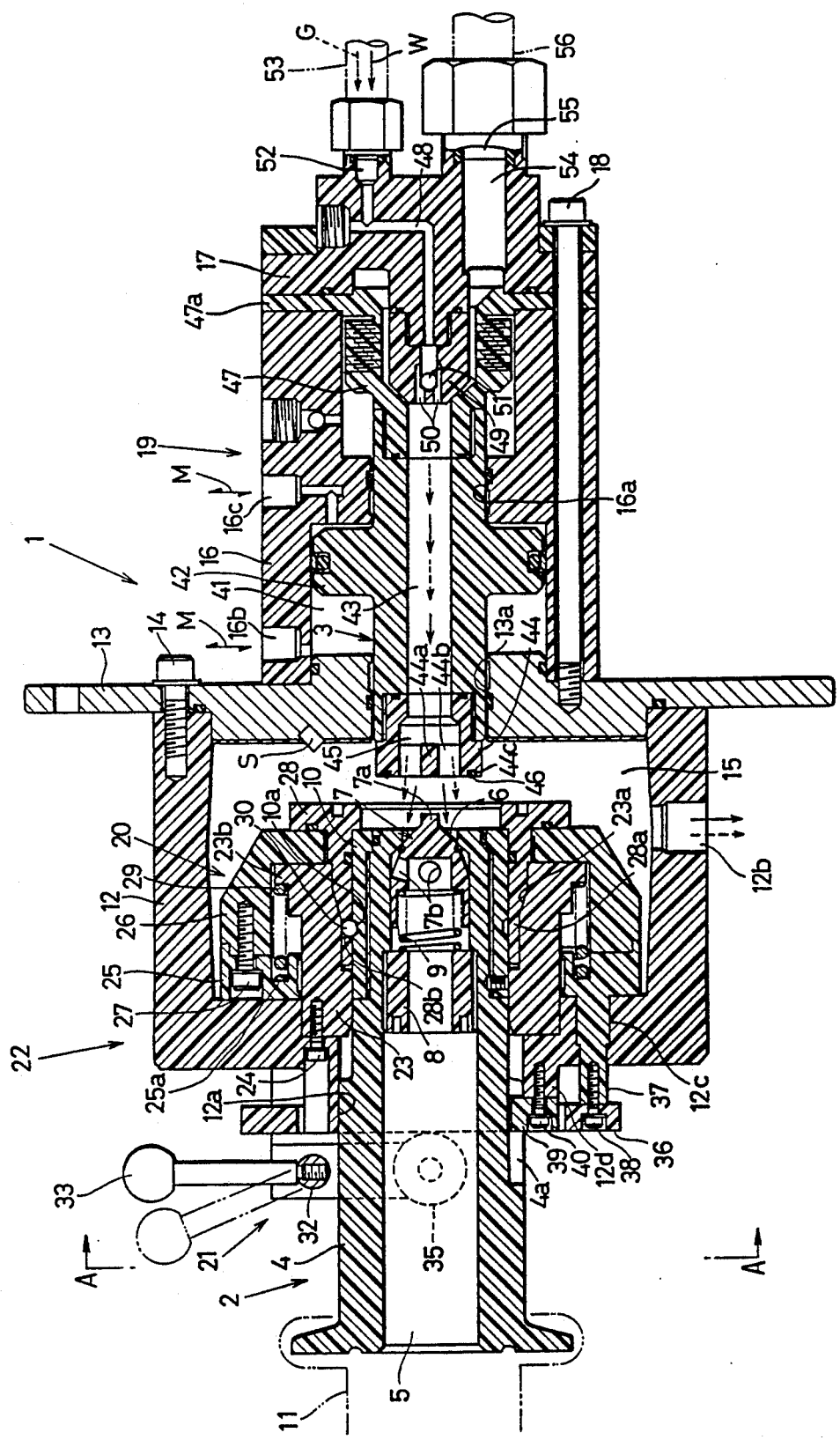
FIG. 1 is a vertically-sectioned view showing the whole of the coupling device according to an embodiment of the present invention.

FIG. 1 shows a coupling device 1 for coupling one side pipe with the other side one to allow a chemical solution of high purity N, for example, to be transferred from one side to the other side through them. More specifically, the coupling device 1 is intended to couple or communicate a solution supplying pipe 2 with a solution supplied one 3 to transfer or supply the chemical solution N to the solution supplied side through them.

Figure 3:
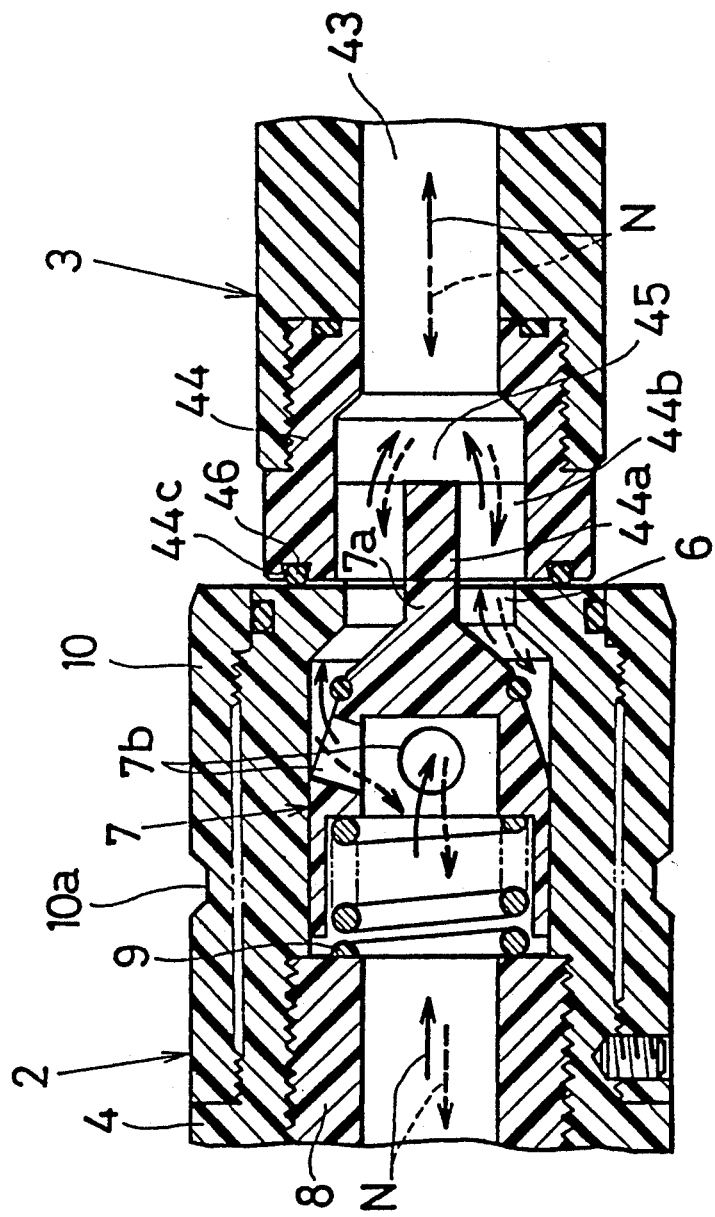
FIG. 3 is an enlarged vertically-sectioned view showing the male coupling half coupled with its corresponding female coupling half.

As shown in FIGS. 1 and 3, the solution supplying male pipe 2 has a passage 5 formed in a cylindrical pipe 4 along the axial center line thereof, and a solution inlet/outlet section 6 is formed in the front end of the pipe body 4, locating in the center of the pipe body 4 and communicating with the passage 5 in it. A conical valve 7 is held in the solution inlet/outlet section 6 to serve as the check valve movable into and out of the section 6 along the axial line thereof. A compressed coil spring 9 is interposed between the valve 7 and a cylindrical stopper 8, which is fixedly screwed in the passage 5 behind the valve 7, to usually urge the valve 7 in such a direction that the outer circumference of the valve 7 is closely contacted with the inner circumference of the solution inlet/outlet section 6 to close the passage 5. A projection 7a is projected from the center front end of the valve 7 into the solution supplied pipe 3 and the valve 7 has those plural holes 7b in its wall through which the solution N is passed.

A sleeve 10 is fixedly screwed onto the front end portion of the pipe body 4, and a ball holder groove 10a is formed like a ring round the sleeve 10 at the center portion thereof when viewed in the axial direction. A key holder groove 4a having a certain length is formed on the center portion of the pipe body 4 along the axial direction thereof and a solution supplying pipe 11 made of fluorocarbon resin and shown by a two-dot and dash line in FIG. 1 is connected to the rear end of the pipe body 4.

A flange 13 is fitted onto that end portion of the solution supplied female pipe 3 to which the solution supplying male pipe 2 is coupled or connected. Further, a case cover 12 is fixed to the flange 13 by bolts 14. A space defined by the case cover 12 and the flange 13 serves as a cleaning chamber 15. A cylinder 16 and a flange connector 17 are closely fitted to the solution supplied female pipe 3. When the cylinder 16 and the flange connector 17 are fixed, under this state, to the flange 13 by bolts 18, a solution supplied coupling half 19 is formed.

A male pipe inserted hole 12a having an outer diameter same as that of the solution supplying male pipe 2 is formed in the center of that side of the case cover 12 into which the male pipe 2 is inserted. In addition, a drain hole 12b through which pure water W and dry gas (or air) G are drained is formed in the bottom side of the case cover 12. A lock system 20 for fixing the male pipe 2 which has been inserted into the cover case 12 is arranged in the case cover 12 and a lock release system 21 for releasing the male pipe 2 is arranged outside the case cover 12. These lock and lock releasing systems 20 and 21 form a ball lock mechanism 22 which serves as a pipe fixing means.

The lock system 20 comprises an inner case 23 fitted into an inner hole continuous from the male pipe inserted hole 12a of the case cover 12 and fixed there by bolts 24, a side plate 25 and an outer case 26 located round the inner case and fixed each other by bolts 27, a ball holder 28 inserted into the front end of the inner case 23 and fixedly screwed into the outer case 26, and lock balls 30.

The inner diameter of a receiving hole 23a in the front end of the inner case 23 and the outer diameter of an inserted portion 28a of the ball holder 28 become smaller and smaller as they come nearer to the rear side. A compressed coil spring 29 is interposed between a ring-shaped step 23b on the front end of the inner case 23 and a ring-shaped recess 25a on the inner side of the side plate 25, so that the inserted portion 28a of the ball holder 28 can be urged into the receiving hole 23a of the inner case 23. The passage formed by inner circumferences of the inner case 23 and the ball holder 28 has an inner diameter same as the outer diameter of the front end of the solution supplying male pipe 2.

Plural ball holder holes 28b are formed in the inserted portion 28a of the ball holder 28, having a certain interval interposed between them in the circumferential direction of the ball holder 28, and the lock balls 30 are held in them, movable back and forth in the radial direction of the ball holder 28.

As the inserted portion 28a of the ball holder 28 is inserted deeper and deeper into the receiving hole 23a of the inner case 23, the lock balls 30 in the ball holder holes 28b of the ball holder 28 are urged by that inner circumference of the inner case whose inner diameter becomes smaller to thereby project from the inner circumference of the ball holder 28 and seat in the ring-shaped ball holder groove on the sleeve 10 of the male pipe 2. The ball holder 28 can be thus fixed on the sleeve 10. When the lock balls 30 are moved to face the larger-diameter portion of the receiving hole 23a of the inner case 23, they are made free in ball holder holes 28b of the ball holder 28 so that they can be released from the ring-shaped ball holder groove 10a of the sleeve 10.

Figure 2:
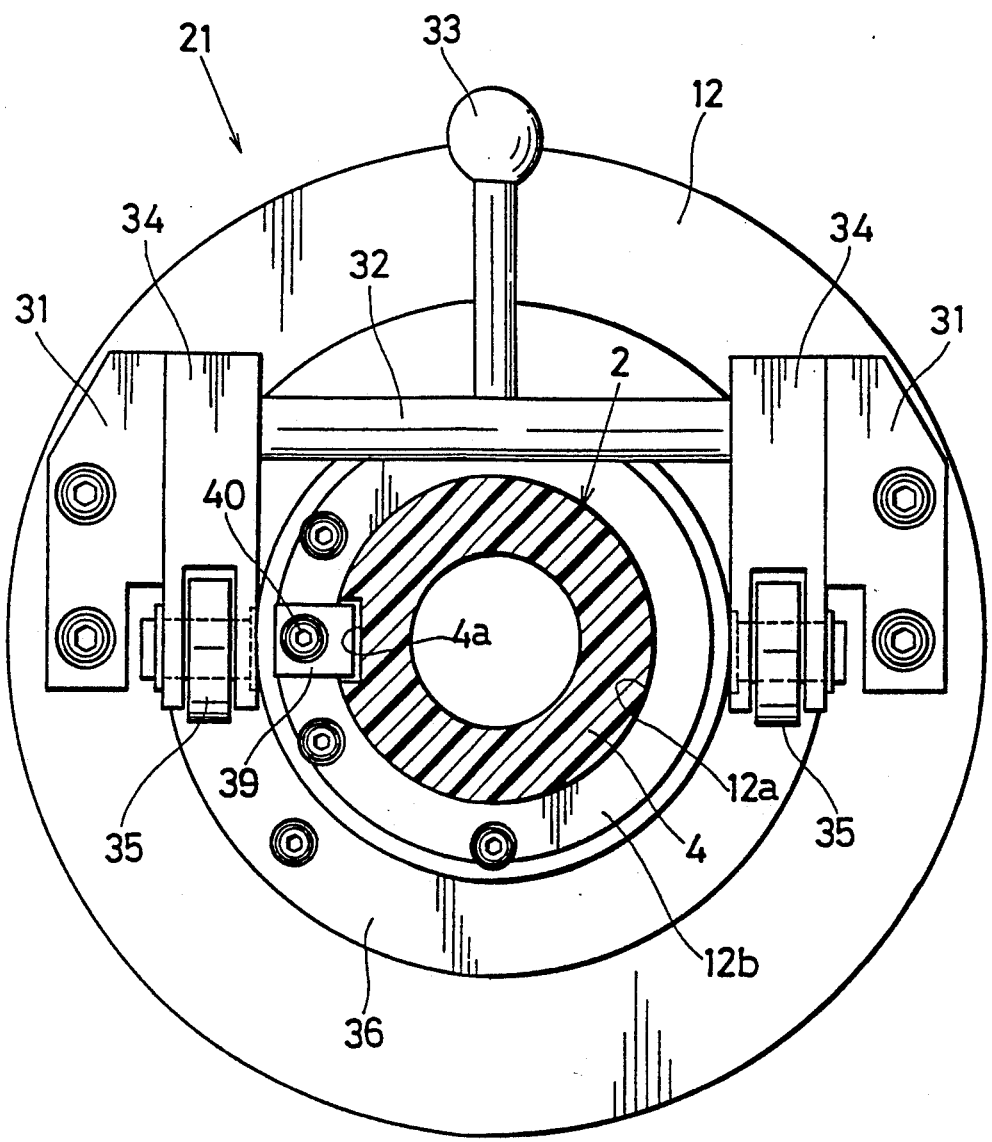
FIG. 2 is a sectional view taken along a line A—A in FIG. 1.

As also shown in FIG. 2, the lock release system 21 comprises a pair of bases 31 fixed round the male pipe inserting hole 12a of the case cover 12, a release lever 33 fixed to the center of a rod 32 between the bases 31, arms 34 fixed to both ends of the rod 32, rollers 35 each rotatably attached to the lower end of each of the arms 34, a pusher ring 36 fitted on an outer circumference 12d of the male pipe inserting hole 12a and opposed to the rollers 35 in the axial direction, and pusher pins 37 fixed to the pusher ring 36 by bolts 38, slidably passed through guide holes 12c in that side of the case cover 12 into which the male pipe 2 is inserted, and formed integral to the side plate 25.

When the release lever 33 is operated to push the rollers 35 against the end face of the pusher ring 36, the side plate 35, the outer case 26 and the ball holder 28 can be moved back and forth in the axial direction through the pusher ring 36 and the pusher pins 37.

A key 39 which can be engaged with the key groove 4a on the outer circumference of the male pipe 2 is fixed to the outer circumference 12d of the male pipe inserting hole 12a of the case cover 12 by a bolt 40. When the shape, number and position of the key 39 held in the key groove 4a are variously changed together with those of the key groove 4a, various keying patterns can be created to allow their corresponding solutions N to be flowed from one side of the coupling device to the other side thereof. Namely, the solution supplying male pipe 2 can be coupled with the solution supplied female pipe 3 only when the keying pattern coincides with its corresponding solution N to be flowed.

The flange 13 and the cylinder 16 are closely fitted to each other to form an air-tight chamber 41 in the male pipe inserted coupling half 19 and air openings 16b and 16c are formed on the outer circumference of the cylinder 16, communicating with the air-tight chamber 41. A piston part 42 formed integral on the outer circumference of the female pipe 3 and at the center portion thereof when viewed in the axial direction is slidably inserted in the air-tight chamber 41, and this piston part 42 and the cylinder 16 form a pipe moving coupling half. The front end portion of the female pipe 3 is inserted into a guide hole 13a in the center of the flange 13, while the rear end portion thereof into a guide hole 16a in the center portion of the cylinder 16.

A sensor S for detecting connection and detachment between the solution supplying and supplied male and female pipes 2 and 3 is attached to that face of the flange 13 which is contacted with the solution N. An automatic control unit is also provided to start and stop the supply of the solution N responsive to signals applied from the detection sensor S. This automatic control unit is under the control of a computer and description on the control unit will be omitted because the computer-controlled unit of this type is well-known.

As also shown in FIG. 3, the solution supplied female pipe 3 has a passage 43 formed therein along its axial center line and a pusher holder 44 is fixedly screwed into the front end of the female pipe 3. A solution passage 45 communicated with the passage 43 in the female pipe 3 is formed in the center of the press piece 44. A valve pusher 44a for causing the valve 7 to be opened and closed is formed in the center of the solution passage 45 in opposite to the projection 7a of the valve 7 which is projected from the solution inlet/outlet section 6. This valve pusher 44a is supported by ribs 44b formed on the inner circumference of the passage 45.

A ring-shaped dovetail groove 44c is formed on that end face of the pusher holder 44 which is located on the male pipe side, and an O-ring 46 is fitted in the dovetail groove 44c.

On the other hand, a bellows 47 is fixedly screwed into the rear end of the female pipe 3. This bellows 47 is communicated with the passage 43 in the female pipe 3 and a ring-shaped flange 47a extending outward in the radial direction from the rear end of the bellows 47 is sandwiched between the cylinder 16 and the flange connector 17.

An L-shaped cleaning liquid passage 48 is formed in the center of the flange connector 17. A valve 49 is fixedly screwed onto that front end of the flange connector 17 which is inserted into the bellows 47, and this valve 49 and the bellows 47 form a valve system for opening and closing the solution passage 43 in the female pipe 3. A cleaning liquid outlet 50 is formed in the center of the valve 49, communicating with the cleaning liquid passage 48, and a ball valve 51 which serves as a check valve is slidably held in the valve 49.

A cleaning liquid supply opening 52 is formed in the flange connector 17 at the upper rear end thereof, communicating with the cleaning liquid passage 48. A cleaning liquid supply pipe 53 capable of changing the cleaning liquid rom pure water W to dry air G and vice versa is connected to the cleaning liquid supply opening 52. The pipe 53 is connected to pure water and dry air supply sources (not shown) through a changeover valve (not shown).

A solution passage 54 is formed in the flange 4 connector 17 at the bottom side thereof, communicating with the bellows 47. A solution opening 55 is formed in the rear end of the solution passage 54 and a solution supplied pipe 56 (shown by a dot and dash line in FIG. 1) made of fluorocarbon resin is connected to the solution opening 55.

The components 4, 7, 17, 42, 44, 47 and 49 which are contacted with solution are made of PTFE (Polytetrafluroethylene) or PFA (Perfluoroalkoxyfluoroplastics) resin and the other ones 10, 12, 16, 23, 24, 26, 28, 36 and 39 which are not contacted with solution are made of PVDF (Polyvinyliden fluoride) resin. In addition, the bolts 14, 18, 24, 47, 40, the coil springs 9, 29, the solution-contacted face of the flange 13, the lock balls 30 and the ball valve 51 are coated with fluorocarbon resin.

It will be described how the solution supplying and supplied male and female pipes 2 and 3 are connected with each other in the case of the above-described coupling device 1.

As shown in FIG. 2, the solution supplying male pipe 2 is inserted into the hole 12a of the case cover 12 which is a component of the solution supplied female pipe 3, and the key 39 of the case cover 12 is engaged with the key groove 4a of the male pipe 2.

When the male pipe 2 is further inserted into the inner case 23 and the ball holder 28 in the cleaning chamber 15, the lock system 20 is made operative to cause the lock balls 30 in the ball holder 28 to be seated in the ball holder groove 10a of the male pipe 2, so that the male and female pipes 2 and 3 can be locked keeping their contacted ends adjacent to each other.

When air M is supplied into the air-tight chamber 41 through the air opening 16b of the cylinder 16 to slide the female pipe 3 backward, the bellows 47 is compressed to closely contact the valve 49. The solution passage 54 in the flange connector 17 is thus closed. Pure water W is then supplied into the cleaning liquid passage 48 through the cleaning liquid supply opening 52 of the flange connector 17 to cause the ball valve 51 to communicate the cleaning liquid passage 48 with the solution passage 43. The pure water W is thus jetted into the cleaning chamber 15 through the solution passage 45 of the pusher holder 44. As the result, the pure water W is struck against those end portion and face of the male pipe 2 which are opposed adjacent to the front end of the solution passage 45, and such impurities on them as dust and particles can be thus washed and removed from them and the solution passage 43 in the female pipe 3 can also be cleaned at the same time.

The supply of the pure water W is then stopped. Dry air G is supplied into the cleaning liquid passage 48 through the cleaning liquid supply opening 52 to dry the solution passages 43 and 45. In addition, it also blows the end portion and face of the male pipe 2 to dry them.

When these cleaning and drying processes are finished, the pure water W and the dry air G are forcibly drained, together with the impurities such as dust and particles removed, outside the cleaning chamber 15 through the drain hole 15b. This prevents any impurities removed from being left in the cleaning chamber 15 and mixed with a solution N which will be thereafter supplied.

When compressed air M is supplied through the air opening 16c of the cylinder 16 to slide the female pipe 3 forward after the stop of dry air supply, the bellows 47 is elongated and its close contact with the valve 49 is released to open the solution passage 54. The solution passage 54 is thus communicated with the solution passage 43 in the female pipe 3 and the O-ring 46 on the front end face of the female pipe 3 is closely contacted with the front end face of the male pipe 2, as shown in FIG. 3, so that the male and female pipes 2 and 3 can be contacted air tight with each other.

At the same time, the valve pusher 44a in the solution passage 45 of the female pipe 3 is struck against the projection 7a, which is projected from the solution inlet/outlet section 6 of the male pipe 2, to push the valve 7 against the coil spring 9. The solution inlet/outlet section 6 of the male pipe 2 is thus opened to communicate the solution passage 5 in the male pipe 2 with the one 43 in the female pipe 3. When it is detected by the detecting sensor S that this connection of the male pipe 2 with the female one 3 has been finished, the supply of the solution N is automatically started responsive to detection signal applied. In other words, the solution N is transferred from the transportation tank into the storage tank. The cleaning liquid passage 48 is closed this time by the valve 51.

When the male pipe 2 is to be detected from the female pipe 3, compressed air M is supplied into the air-tight chamber 41 through the air opening 16b of the cylinder 16 to slide the female pipe 3 backward. The bellows 47 is thus compressed and it is closely contacted with the valve 49 to close the solution passage 54. At the same time, the valve 7 is closely contacted with the solution inlet/outlet section 6 of the male pipe 2 to close the solution passage 5. When this detachment is detected by the sensor S, the supply of the solution N is automatically stopped in responsive to detection signal applied.

When the release lever 33 is then swung to such a position as shown by a two-dot and dash line in FIG. 1, the lock balls 30 in the ball holder 28 are released from the ball holder groove 10a of the male pipe 2. When the male pipe 2 is pulled under this state out of the hole 12a in the case cover 12 of the female pipe 3, therefore, it can be completely detached from the female pipe 2.

As described above, those front end portion and face of the male pipe 2 which are located on the side of the female pipe 3 are washed and cleaned by pure water W jetted through the solution passage 43 in the female pipe 3 before the male pipe 2 is connected to the female pipe 3. Impurities such as dust and particles adhered can be therefore removed from these parts of the male pipe 2. In addition, any impurities can be prevented from entering into a solution N which will be thereafter supplied because the male and female pipes 2 and 3 are connected air tight with each other after they are washed and cleaned as described above. Further, the purity and quality of the solution N can be kept unchanged. This makes the coupling device more reliable.

As described above, it is detected by the sensor S whether the male pipe 2 is connected to or detached from the female pipe 3, and the supply of solution is automatically started and stopped in response to signals thus applied. The leakage of solution because of faulty connection, for example, can be thus prevented with a higher reliability and the sealing of the coupling device can be kept higher.

Further, the connecting of the male pipe 2 to the female pipe 3 is allowed only when the pattern of the key 39 engaged with the key groove 4a of the male pipe 2 coincides with a solution to be supplied. Therefore, the primary mistake of connecting the male or female pipe to a pipe which does not correspond to this male or female pipe can be prevented with a higher reliability.

Although the piston section 42 of the female pipe 3 has been slid in the axial direction to connect the male and female pipes 2 and 3 with each other in the above-described case, it may be arranged that the male pipe 2 is moved in the axial direction by drive means such as an air cylinder to connect them together.

Alarms such as the lamp and the buzzer may be made operative in response to signals applied from the sensor S.

The coupling device of the present invention is suitable for transferring those chemical solutions and ultra-pure water whose purities must be kept unchanged and it can be used to transfer other solutions such as corrosive one as well.

What is claimed is:

1. In a coupling device comprising means for fixing a solution supplying male pipe, which is to be inserted into a cleaning chamber, adjacent and in opposite to a solution supplied female pipe which is arranged in the cleaning chamber, and means for moving the solution supplied female pipe in such a direction that it can be connected to the solution supplying male pipe, said coupling device further comprising a check valve arranged in that end portion of a solution passage in the male pipe which is located on the side of the female pipe; a valve pusher formed in that end portion of a solution passage in the female pipe which is located on the side of the male pipe to push the female pipe against the male one so as to cause the check valve to open the solution passage in the male pipe; a valve system arranged in the rear end portion of the solution passage in the female pipe; a cleaning liquid passage communicated with the solution passage in the female pipe to supply cleaning liquid through it; and a check valve arranged in the outlet of the cleaning liquid passage.

2. The coupling device according to claim 1, wherein said cleaning chamber is a space defined by a flange fitted into the connected-side end portion of the female pipe and by a case cover closely fixed to the flange, and said case cover is provided in its bottom side with a hole through which cleaning liquid is drained.

3. The coupling device according to claim 2, wherein a sensor is attached to that face of said flange which is contacted with solution supplied to detect whether the male pipe is connected to or detached from the female pipe, and an automatic control unit starts and stops the supply of solution responsive to signals applied from the sensor.

4. The coupling device according to claim 2, wherein a keying system is arranged between the male pipe and the case cover of the female pipe to allow the male and female pipes to be connected together only when its keying pattern coincides with a solution to be supplied.

5. The coupling device according to claim 1, wherein said check valve in the connecting-side end portion of the solution passage in said male pipe is a conical one held movable back and forth in a solution inlet/outlet section communicated with the solution passage in said male pipe, it has a projection projected from the center of its front end toward the female pipe, and it is usually urged to close the solution passage in said male pipe by a spring.

6. The coupling device according to claim 1, wherein said cleaning liquid passage is opened in the center of said valve system by which the solution passage in the female pipe is opened and closed.

7. The coupling device according to claim 1, wherein a pure water supply source is connected to said cleaning liquid passage.

8. The coupling device according to claim 1, wherein a system is arranged in the cleaning liquid passage to freely change the liquid from pure water to dry gas and vice versa.

9. The coupling device according to claim 1, wherein said male and female pipes are intended to supply solutions such as high purity chemical ones and ultra-pure water through them.

* * * * *

UNITED STATES PATENT AND TRADEMARK OFFICE
CERTIFICATE OF CORRECTION

PATENT NO. : 5,311,899

DATED : May 17, 1994

INVENTOR(S) : Kazuhisa Isayama et al

It is certified that error appears in the above-identified patent and that said Letters Patent is hereby corrected as shown below:

Claim 1, column 9, line 7, between "pipe" and the ";" insert --to move the female pipe in the axial direction so as to open and close the solution passage in the female pipe;--.

Signed and Sealed this

Thirtieth Day of August, 1994

*Attest:*

BRUCE LEHMAN

*Attesting Officer*     *Commissioner of Patents and Trademarks*